(12) United States Patent
Simpson et al.

(10) Patent No.: US 7,321,902 B2
(45) Date of Patent: Jan. 22, 2008

(54) MECHANISM FOR SHARING WEB-BASED IMAGING INFORMATION FROM A MULTI-FUNCTION PERIPHERAL

(75) Inventors: Shell S. Simpson, Boise, ID (US); Ward S. Foster, Boise, ID (US); Kris R. Livingston, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 419 days.

(21) Appl. No.: 10/219,101

(22) Filed: Aug. 15, 2002

(65) Prior Publication Data
US 2004/0034654 A1   Feb. 19, 2004

(51) Int. Cl.
G06F 17/30 (2006.01)
(52) U.S. Cl. .................... 707/104.1; 709/203
(58) Field of Classification Search ............... 707/3, 707/4, 9, 10, 102, 104.1; 358/302, 501, 505; 709/203, 219
See application file for complete search history.

(56) References Cited

U.S. PATENT DOCUMENTS 5,956,487 A     9/1999  Venkatraman et al.
6,396,951 B1 *  5/2002  Grefenstette ................ 382/187
6,421,429 B1 *  7/2002  Merritt et al. ............ 379/93.17
6,771,290 B1 *  8/2004  Hoyle ......................... 715/745
6,806,978 B1 * 10/2004  Tamura et al. ............. 358/1.15
2002/0054397 A1 * 5/2002  Matsushima ................ 358/524
2002/0085244 A1 * 7/2002  Blasio et al. ................ 358/474
2002/0116291 A1 * 8/2002  Grasso et al. ................. 705/27
2002/0135794 A1 * 9/2002  Rodriguez et al. ......... 358/1.15
2003/0043416 A1 * 3/2003  Rublee et al. .............. 358/402
2003/0084049 A1 * 5/2003  Wiley .......................... 707/10
2003/0115326 A1 * 6/2003  Verma et al. ............... 709/225
2004/0004731 A1 * 1/2004  Itagaki ........................ 358/1.9
2004/0036905 A1 * 2/2004  Chang ........................ 358/1.15

* cited by examiner

Primary Examiner—Leslie Wong

(57) ABSTRACT

The method of the present invention is capable of providing distributed imaging capability to a user of a multi-function peripheral. Document creation, manipulation, editing, and output are provided by the present invention. Document design and image data are associated with the originating user. Generic access instructions cause associated document data to be retrieved or stored in accordance with the present invention. A multi-function peripheral is used to obtain and store at least a portion of image data. Multiple documents and output devices may be employed to accomplish the requesting user's needs. Further, interactive graphical printing configuration and monitoring may be utilized.

24 Claims, 12 Drawing Sheets

MECHANISM FOR SHARING WEB-BASED IMAGING INFORMATION FROM A MULTI-FUNCTION PERIPHERAL

FIELD OF THE INVENTION

The present invention relates to a distributed environment for image processing. More specifically, the present invention relates to apparatus and methods for sharing imaging information between web-based services and devices.

BACKGROUND OF THE INVENTION

Advances in network technology and demands for software and systems capable of taking full advantage of the advancements are growing. Many organizations dependent on information technology are attempting to manage complex network environments (e.g., distributed environments) that incorporate diverse hardware, software, applications, networks, and database systems. The devices in a distributed environment may be totally dissimilar from each other. Also, device components of distributed environments often run entirely different operating systems and are entirely independent of each other but strive to cooperate in the sharing of data. The communications protocols used by such distributed environments tend to be industry standards, such as Systems Network Architecture ("SNA") and TCP/IP. Still, modes of cooperation between networked devices are far from optimal. Thus, there has been an increasing demand for software and systems capable of fully integrating and optimizing use of these disparate components. Moreover, it is desirable for these integrated systems, documents, and software to be hardware independent, support multiple users, and be based on a distributed architecture.

One area in which the resources of a distributed environment are not efficiently utilized is in the realm of web-based image retrieval, manipulation, and utilization. Presently, systems and services exist which allow web users to extract and share various imaging information over the Internet.

On-line information systems typically include one computer system (the server) that makes information available so that other computer systems (the clients) can access the information. The server manages access to the information, which can be structured as a set of independent on-line services. The server and client communicate via messages conforming to a communication protocol and sent over a communication channel such as a computer network or through a dial-up connection. Typical uses for on-line services include document viewing, electronic commerce, directory lookup, on-line classified advertisements, reference services, electronic bulletin boards, document retrieval, electronic publishing, keyword searching of documents, technical support for products, and directories of on-line services, among others. The service may make the information available free of charge, or for a fee, and may be on publicly accessible or private computer systems.

The user of an on-line service typically uses a program on the client system, such as a web browser, to access the information managed by the on-line service. Possible user capabilities include viewing, searching, downloading, printing, and filing the information managed by the server.

Another area where distributed sharing and accessing of information would be beneficial involves multi-function printing devices (MFP). A multi-function printing device is a device that functions as a printer, but may also function in another capacity. For instance, MFPs capable of copying, faxing, scanning, and printing are often used in office environments. Furthermore, MFPs are often used to copy documents and images. Typically, when a user copies a document, the image is not stored. Therefore, in order to make additional copies, an MFP, or a traditional copier, must recopy either the original image or a duplicate image. Unfortunately, sometimes copies are copied, thus resulting in a loss in fidelity of the image. If subsequent copies are then copied, additional losses in fidelity occur. Thus, it may be desirable to reduce or eliminate the loss in fidelity of additional copies created on an MFP.

Scanning information previously scanned by the MFP is repetitive and inefficient. Duplications of images that have been previously scanned results in unnecessary use as well as compounding scheduling difficulties associated with MFP resources. Thus, it may be desirable to reduce or eliminate duplicative scanning of substantially identical images.

In addition, copies from different original images cannot be easily integrated after printing. For instance, collations from different images and sources must be assembled for copying. Often, collations are difficult to assemble and cannot be retrieved easily. Minor changes or additions may also cause a complete reorganization of a collation. In addition, it may be desirable to form a collation from disparate copy jobs or parts of copy jobs that requires a reorganization of multiple copy jobs to form the desired collation. Thus, it may be desirable to facilitate creation and modification of collations using an MFP.

Limitations and problems associated with MFPs largely prevent users from gaining possible benefits of MFPs with distributed imaging capability. In addition, hardware and software independence is desirable, because networks as well as the Internet may comprise diverse computer platforms and systems.

It is desirable to provide MFP users with the utmost functionality available. Therefore, it would be of current interest to provide methods and a multifunction peripheral for sharing imaging information between web-based services and devices in a distributed environment. More specifically, the present invention relates to apparatus and methods for sharing imaging information between web-based services and MFPs.

BRIEF SUMMARY OF THE INVENTION

The present invention relates generally to expanding the capability of an MFP in a copying and printing environment to share and output image files. As described earlier, copying options and capability are often restricted by typical printing systems. In contrast to the limited functionality of conventional copiers, MFPs, in conjunction with the Internet, offer the possibility of a multitude of devices and services for image sharing. However, systems for exchanging data as well as employing devices connected to the Internet are needed to exploit the resource potential available via the Internet.

The present invention relates to methods and MFPs for sharing and outputting data in a highly distributed environment. More specifically, an MFP providing a user with functionality to store, and later output data are encompassed in the present invention. Further, the MFP may automatically associate images with a user and cause those images to be stored for later use.

In one embodiment, a user is able to retrieve and configure an image earlier processed by an MFP that is associated with the user. Configuration information as well as image information may be saved and associated with the user as target data. Association allows for generic access instructions (not containing file location information) to cause storage or retrieval of at least one target data file. Further, at least a portion of the target data file may be stored in an independent file format. Thus, the MFP provides storage of a target image into an image storage device.

For example, a user may access an MFP device to create copy job. To access the MFP the user first identifies themselves using an access code or identification of some sort. This may include a keycode, use of a smart card access device, or other identification method. Validating the user, the MFP allows the user to create the desired copy job. Once created, the copy job may also be saved to a storage location as target data that is associated with the user for later retrieval if it is needed. A generic access instruction, or generic executable programming, associated with the MFP may instruct the MFP to create a target image for each and every copy job produced by the MFP. The generic access instruction retrieves from the MFP a profile of the user based upon the user's access information. The generic access instruction then creates a target image from the produced copy job and saves the target image to a storage location associated with the user's access information. Typically, each user may have an assigned storage location, or personal imaging repository, for storing target images created in accordance with the present invention. The personal imaging repository may be located in one or more locations and includes all imaging information associated with a user. The personal imaging repositories may be created at the time a user profile is created for the network or enterprise environment and is used to store only information created by, or associated with, that particular user. The data, or target images, stored in the personal imaging repository may be accessed by a user at a later time.

For instance, when a user uses an MFP device, the user is identified by way of using a smart card, keycode, or other identification means, and the MFP automatically stores any images that are processed to the identified user's personal imaging repository. Subsequently, the images may be accessed by the user and utilized. Usually, producing an additional copy requires a "copier," but, since the MFP saves a copy of the document processed by the MFP into the user's personal imaging repository, the user can produce duplicates by printing copies of the saved image without necessitating access to the original document. Often printers are more readily available than copiers.

A client configured with a web browser and a software extension accesses web content that provides generic access instructions for accessing at least one target data file. "Extension", as used herein, refers to software that extends the built-in capabilities of the browser. Among other things, the extension responds to generic access instructions by generating generic access requests. "Generic access instructions or requests", as used herein, denote executable instructions not containing file location or user identity information which are intended to cause a target file to be accessed or stored. Generic access instructions are processed by the extension to generate generic access requests that are combined with local user identity information to determine file location information, thus accessing at least one target data file. Multiple target data files may be stored and retrieved in response to generic access instructions.

In addition, upon target data file retrieval, output of the target image file may be accomplished by accessing an MFP of the present invention. Selectable options are provided in accordance with the output device(s) selected. Furthermore, graphical output configuration, print preview, and print monitoring may be provided. Multiple target file output as well as multiple output device(s) may be employed to accomplish user requirements.

In further embodiments, image configuration, storage, and output may be disseminated as separate functions. Accordingly, the separate functional aspects of the invention may be commercialized. Further, the separately distributed imaging functions may be employed in combination to accomplish user requirements.

Other features and advantages of the present invention will become apparent to those of ordinary skill in the art through consideration of the ensuing description, the accompanying drawings, and the appended claims.

BRIEF DESCRIPTION OF THE SEVERAL VIEWS OF THE DRAWINGS

In the drawings, which illustrate what is currently considered to be modes for carrying out the invention.

DETAILED DESCRIPTION OF THE EMBODIMENTS

Figure 1:
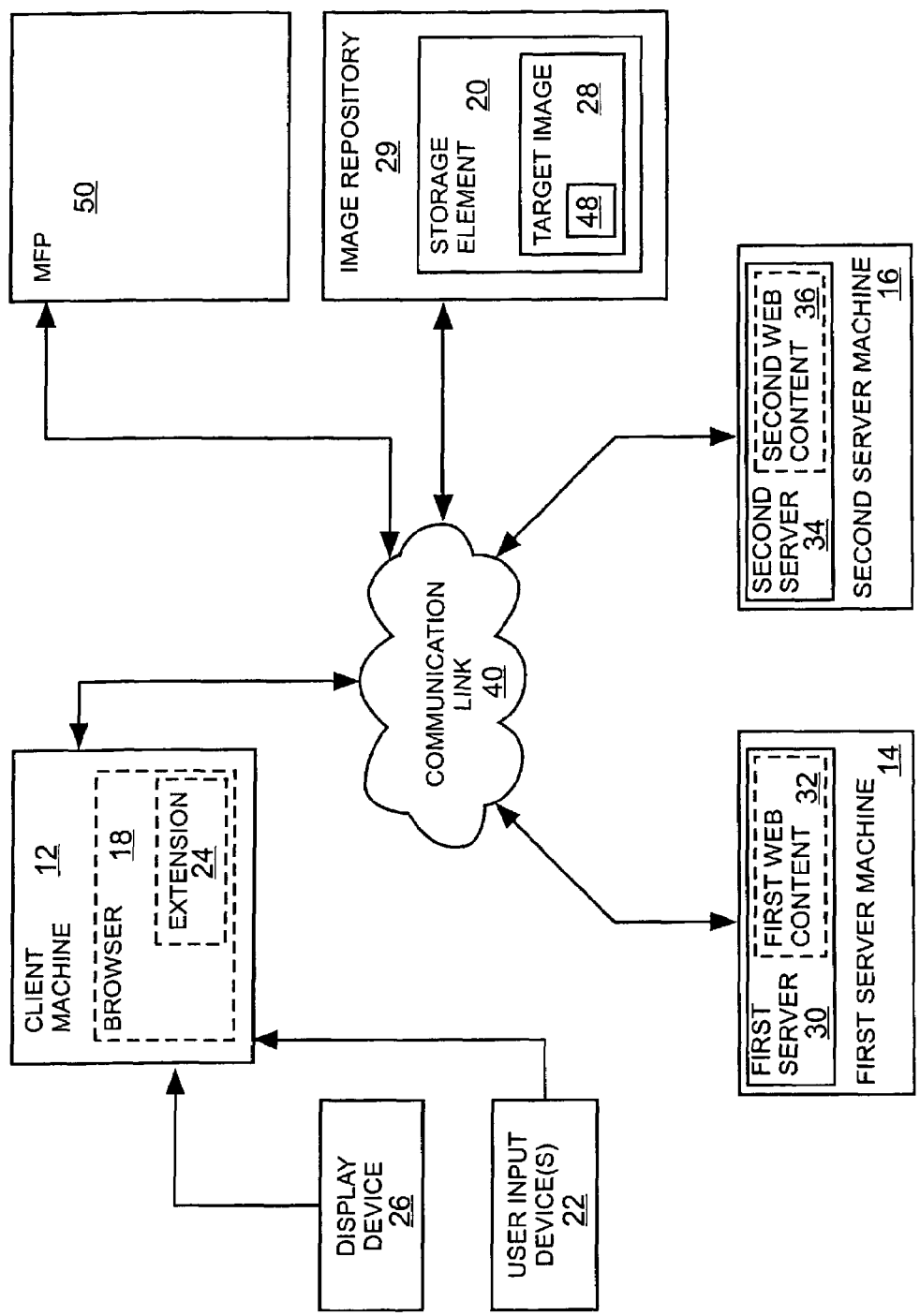
FIG. 1 is a schematic representation of a first embodiment incorporating teachings of the present invention wherein the MFP can store images to a storage repository.

FIG. 1 shows a client machine 12 comprised of a display device 26 and user input device(s) 22. Client machine 12 communicates with the Internet and other systems via conventional communication apparatus depicted in communication link 40. For instance, network interfaces, routers, and hubs may be employed to conduct communication responsibilities as part of communication link 40. This may allow for the client machine 12 to establish direct connection with other network peers, depending on the network configuration.

A first embodiment is shown in FIG. 1, wherein an MFP 50 is configured to communicate with other devices via communication link 40. In the prior art, any copy, scan, or fax jobs performed on the MFP 50 are not retained for further use. However, in the first embodiment of the present invention, MFP 50 has the capability to cause images processed by the MFP 50 to be stored. For instance, an image that is scanned, faxed, or copied by way of the MFP 50 is caused to be stored within storage element 20 as a target image 28. Such storage may occur transparently, without input from the user, or may be requested/configured by the user according to the capability of the MFP 50.

MFP 50 is configured with scanning capability or the capability to reproduce a hardcopy image to a digital or electronic data representation of the image. An image scanned by the MFP may be temporarily stored in a limited storage device within the MFP 50. Software associated with the MFP may process the image data to improve image quality, enlarge, reduce, or otherwise modify the image. The MFP 50 may translate and/or transfer a digital image to a reproduced hardcopy or to a data file for use with other systems. Thus, the MFP may be used to created a digital or electronic data file that may be shared, stored, or communicated as image data over the Internet or with other systems capable of using imaging data.

In the present invention, the MFP 50 includes means to effect storage and retrieval of an image captured or generated by way of MFP 50. Furthermore, an image configured by way of MFP 50 may become a target image 28. In addition, the MFP may include the capability of associating the most recently processed image with the user's default target image. Thus, the MFP 50 may be configured to interact with the distributed imaging system using the method of the present invention.

A first server machine 14 includes a first server 30, which can respond to an appropriate request via communication link 40 from the browser 18 by supplying a first web content 32. Similarly, a second server machine 16 including a second server 34 can respond to a request via communication link 40 from the browser 18 by supplying a second web content 36. First web content 32 and second web content 36 include generic access instructions. Generic access instructions are executable instructions intended to cause the executing device to generate generic access requests in order to access and/or store a target image 28. However, generic access instructions and generic access requests do not include the location of the target image 28. Instead, this information may be determined by logic in the extension that applies the generic access requests to the current user identity and the current user's preferences to arrive at a specific location for the target image.

Therefore, a user may define an image by providing input via the MFP 50. The image may be configured from scanning, faxing, copying, or other sources available. As a result, the MFP 50 stores a target image 28 created using the MFP. User login information or any other software or hardware functionality may be used to associate the target data 28 with the user. Thus, the target image 28 is associated with the user MFP 50. As shown, the target image 28 is stored in storage element 20. Multiple target images 28 associated with a user may be stored in storage element 20 or in multiple storage locations. In this embodiment, the image repository 29 is a separate entity from all other devices. However, the storage element 20 may reside within other devices such as the MFP 50 or the client machine 12.

Subsequent to image acquisition by way of MFP 50, a user may retrieve an image stored by MFP 50 by way of client machine 12, and by providing input via the user input devices 22. To accomplish this functionality, the client machine 12 may request image(s) from the image repository 29. The requested image may be produced from a personal image repository 29 associated with the user of the MFP 50. Based upon the user profile, or a user's personal information, the user may generate a "copy" of the image that was earlier processed by the MFP 50 by retrieving the target image associated with the earlier copy job from the personal image repository 29 of the user. The "copy" may be sent to a printer, copier, MFP, fax machine, email server, or other device for viewing or output.

Further, the user may configure an image or set of images by retrieving at least one MFP image from the image repository 29. A produced image may be configured from other images, or other available sources. As an example, an image retrieved from the Internet may be associated with or combined with a target image retrieved from a personal image repository 29 of a user to create an image for production by the MFP 50.

Thus, a user provides input (via the user input device 22) to the client machine 12 in order to define an image. The client machine 12 receives this input and creates a set of (user defined) design data 48 describing the image. Next, the client machine 12 provides the user with an option to store the design data 48 and image data as a target image 28. This option may be provided to the user via a user interface displayed by the display device 26. In response to this user input, the client machine 12 identifies the design data 48 (user defined) and image data as the target image 28 for the user of client machine 12. As a result, upon the client machine 12 subsequently receiving generic access instructions, the client machine 12 will respond to these instructions by accessing target image 28. Thus, the target image 28 is associated with the user of client machine 12. User login or any other software or hardware functionality may be used to associate the target data 28 with the user. As shown, the target image 28 is stored in storage element 20. Multiple target images 28 associated with a user may be stored in storage element 20.

Therefore, when generic access instructions to store the design data 48 and image data are received, the target image 28 is stored within the image repository 29 within storage element 20. Storage of the target image 28 may be attained via common printing file formats such as Adobe PostScript® or compatible languages, PDF, or others known in the art.

It is further contemplated that design data 48, if available, may be stored separately from image data comprising target image 28. Such a configuration may allow access to an editing function without loading the image. Furthermore, design data 48 may include enough information to completely generate the target image 28. For instance, design data 48 may specify images contained within a graphics service, or other graphics store available on the Internet. Also, design data 48 may include specific MFP 50 information and/or commands in order to generate a target image. Relative position (on the printing page) and other formatting information may be included in design data 48. Thus, design data 48 may completely specify target image 28 and therefore may be used to cause printing of a target image 28.

Therefore, as described hereinabove, target images may be created somewhat transparently, without the user's conscious effort, simply by using an MFP. In one example, the MFP stores a target image(s) without any user intervention (other than providing user identification). Further, users of a client machine may subsequently use a target image(s) obtained at least partially by way of MFP 50 to create additional target images.

Figure 7:
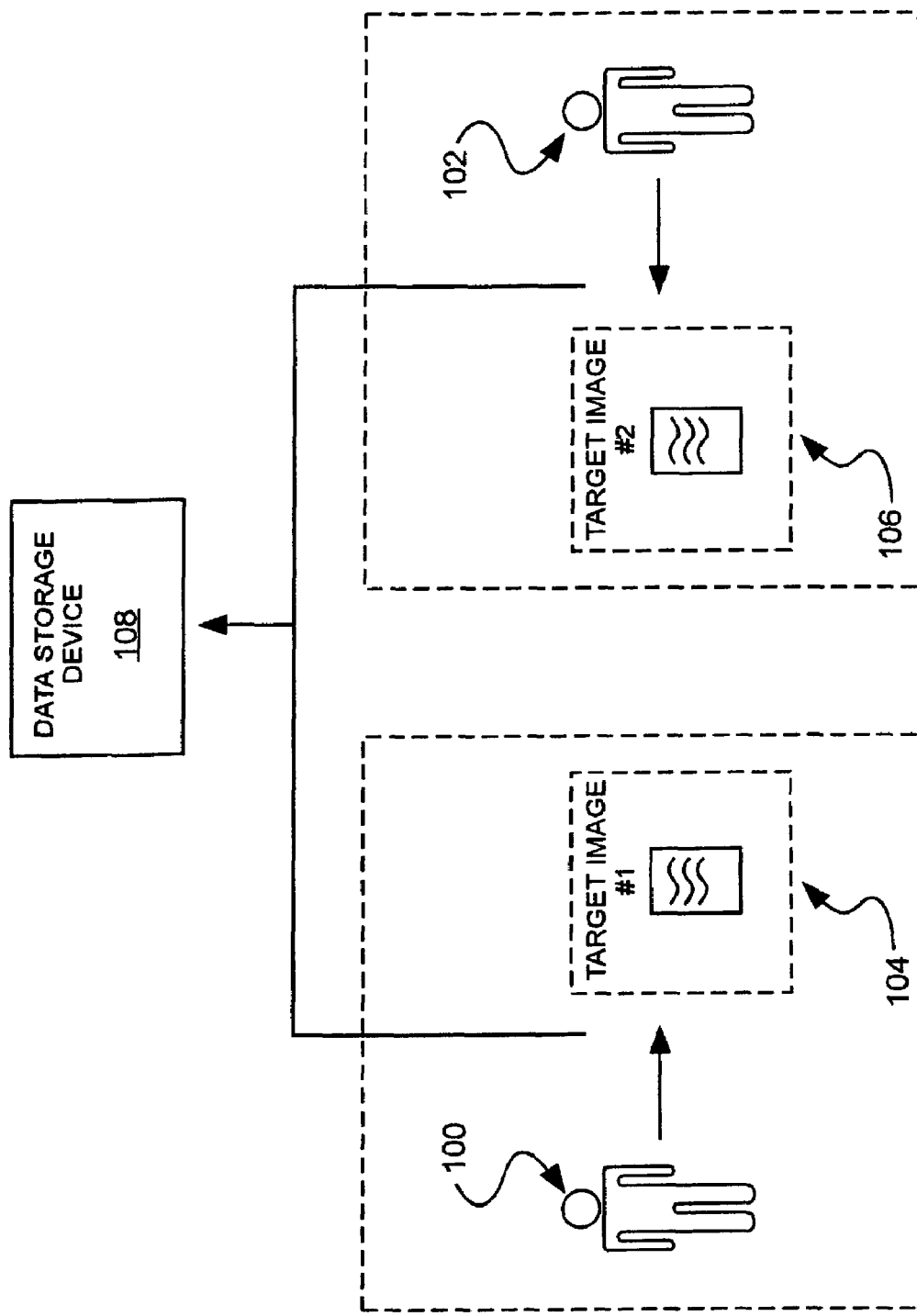
FIG. 7 is a representation of target image retrieval by two different users incorporating teachings of the present invention.

FIG. 7 depicts the association of target image 104 with user 100 and the association of target image 106 with user 102. Generic access instructions for retrieving a target image while user 100 is using a client machine cause the retrieval of target image 104, whereas generic access instructions for retrieving a target image while user 102 is using a client machine result in the retrieval of target image 106. Target images associated with different users may be stored in data storage device 108 and subsequently retrieved by the associated user. Association of a user with target images stored in a personal imaging repository occurs once a user is identified by the client machine. The information associated with the user may be used to determine which target image(s), if any, may be retrieved by the user.

Importantly, the target image 28 is stored in a file format that is system independent. More specifically, the file represents the image in a way that is independent of the web content employed to access the image, the local computer operating system, or the hardware used to generate the image. One example of such a format is a PDF file.

"PDF" is an acronym for "Portable Document Format." The format has been designed by Adobe for the exchange of documents on various platforms. Currently, the format is used under Windows, Macintosh and various UNIX platforms. This is essentially a final format-in contrast to SGML-based formats that are aimed to be revisable. "Final" means: it is not primarily aimed at being edited-although this is possible. Final form documents are formatted for visualization on a printer or a screen. In addition, PDF documents are object oriented, wherein each page is an object. Again, PDF creates a file format that represents a document in a manner independent of the hardware, operating system, or software used in its creation.

Using the present invention, an image may be created, configured, and stored using an MFP 50. Alternatively, a client machine user may access images stored by way of MPF 50 from the personal image repository 29 associated with the user to create, and store additional target image(s) 28. In addition, the MFP 50 may be used to retrieve images from the personal image repository 29 that were created using other imaging devices or functions. As long as the image is stored in the personal imagining repository, the MFP 50 may retrieve a target image 28 and use it to create a product image (e.g. printed output). Similarly, other services or devices may use the target images 28 created and stored by the MFP 50.

In order to retrieve the stored target image 28, the user provides the browser 18 with input causing the browser 18 to transmit an appropriate request to the first server machine 14 for the first web content 32. Upon receiving the first web content 32, the browser 18 begins executing the generic access instructions included in the first web content 32. The first web content 32 includes a set of commands that includes one or more generic access instructions and additional commands for causing the display device 26 to display the image represented by the target image 28. The execution of the generic access instructions results in appropriate generic access requests being generated that cause the target image 28 to be retrieved via storage element 20.

Although the client machine 12 may be a workstation or computer system, the client machine 12 may also comprise a portable computing device, such as a Palm computing device, cellular phone, or other portable computing device. Such portable devices may "synchronize" with desktop computers to acquire target image associations, or may initiate associations independently. Further, the browser 18 and/or extension 24 may be tailored depending on the capability of the client machine 12 as well as the capability of the communication link 40. Additionally, a browser 18 may be enabled with multiple extensions that may be executed depending on the characteristics of the client machine 12, communication capability, or user preference.

A portable computing device, such as a personal digital assistant, may effectively utilize the imaging system of the present invention. The browser 18 and/or extension 24 may be tailored to function more effectively according to the characteristics of the computing device as well as the communication conditions. For instance, on a wireless connection to a personal digital assistant computing device with limited bandwidth and computing power, the full preview of the target image 28 may be eliminated, or substantially abbreviated. Conversely, a computer with exemplary computing and communication capability may include extensive preview, editing capability, as well as status information about the target image 28.

Browser 18 responds to the generic access instructions to retrieve the data by retrieving the target image 28 by way of extension 24. More specifically, the extension 24 generates an appropriate set of (device specific) commands, based on which user is currently logged into/using the device, to retrieve the target image 28 in response to the generic access instructions that are received. After the target image 28 is retrieved, the browser 18 causes the display device 26 to display the user-defined image.

The extension 24 is configured to respond to the execution of generic access instructions by generating corresponding specific commands that cause the target image 28 associated with a user as depicted in FIG. 7. It will be understood by a person skilled in the art that the extension 24 may be implemented as a programming interface (similar to an Application Programming Interface or API). The generic access instructions, when executed, may cause calls to be issued to the extension 24 in order to accomplish data access. These calls are the generic access requests generated in response to the generic access instructions.

It will also be recognized that there are many other ways (both hardware and software) to implement this same functionality. The present invention is not limited to any one way. For instance, the various embodiments of the present invention are described with respect to a client side identity approach where a user is identified by extension 24. In the client side identity approach, the extension 24 retrieves a target image 28 based upon the identity of the user as determined by the web browser 88. In an alternative embodiment, a server side identity approach may be used. Identification of a user may be accomplished using a web server wherein the logic of the extension 24 is contained in the web server. The web server may divert a web browser user to an authentication website to determine the identity of the user. Once identified, the web server is provided with the identity of the user and the location or locations of the user's imaging data or target images.

Next, in order to print the target image, the user causes the browser 18 to transmit an appropriate request to the second server 34 for the second web content 36 in order to print the target image 28. The second server 34 responds by transmitting the second web content 36. Again, any device configured with a browser may be used. Importantly, second web content 36 includes generic access instructions for effecting the retrieval of target image 28.

Figure 10:
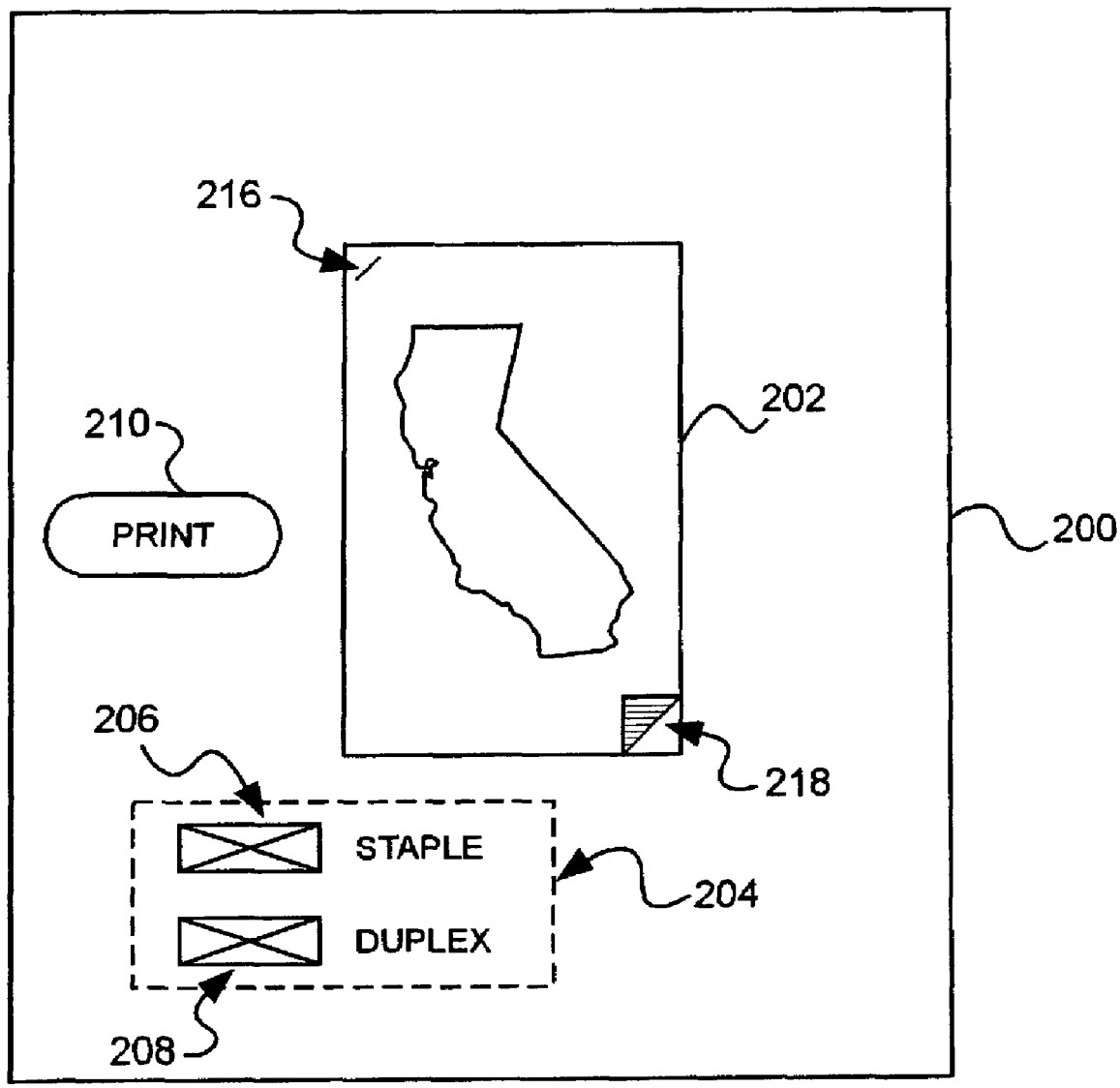
FIG. 10 is a representation of a printer dialog box incorporating teachings of the present invention.

In addition, second web content 36 includes instructions to make use of the retrieved image to display a print dialog box 200, as shown in drawing FIG. 10, that may include a post-process image 202 (i.e., a print preview image) of the target image 28, depending on the capability of the executing device. As an example, client machine 12 would have the capability to display a post-process image 202. It is emphasized that the display of the print dialog box 200 is accomplished by operation of the second web content 36 as opposed to the local operating system or the browser 18.

Furthermore, if a print preview is available and provided, the print dialog box 200 displays selectable options 204 that are based upon the capabilities of the second server machine 16. The selectable options 204 that are selected may be graphically represented within the post-process image 202 to depict the selected options. For instance, if a user selects that the print job should be stapled from selectable options 204, a graphical depiction of a staple 216 appears in the upper left hand corner of the post-process image 202 of the target image 28, as shown in drawing FIG. 10.

After the user configures and requests printing by selecting the print button 210 of the print dialog box 200, the second web content 36 causes the client machine 12 to generate a print job. The print job describes the target image 28 and includes the appropriate commands to cause the second server machine 16 to print the target image 28. The second web content 36 further causes the client machine 12 to transmit the print job to the second server machine 16 to be printed. Importantly, the second web content 36 downloaded in browser 18 is further configured to transmit appropriate requests to the second server machine 16 in order to determine the print job status. Requests and responses are transmitted on a periodic basis to effectively update the print job status. When a response is received indicating the print job status has changed, the second web content 36 causes the client machine 12 to display this information.

Figure 3:
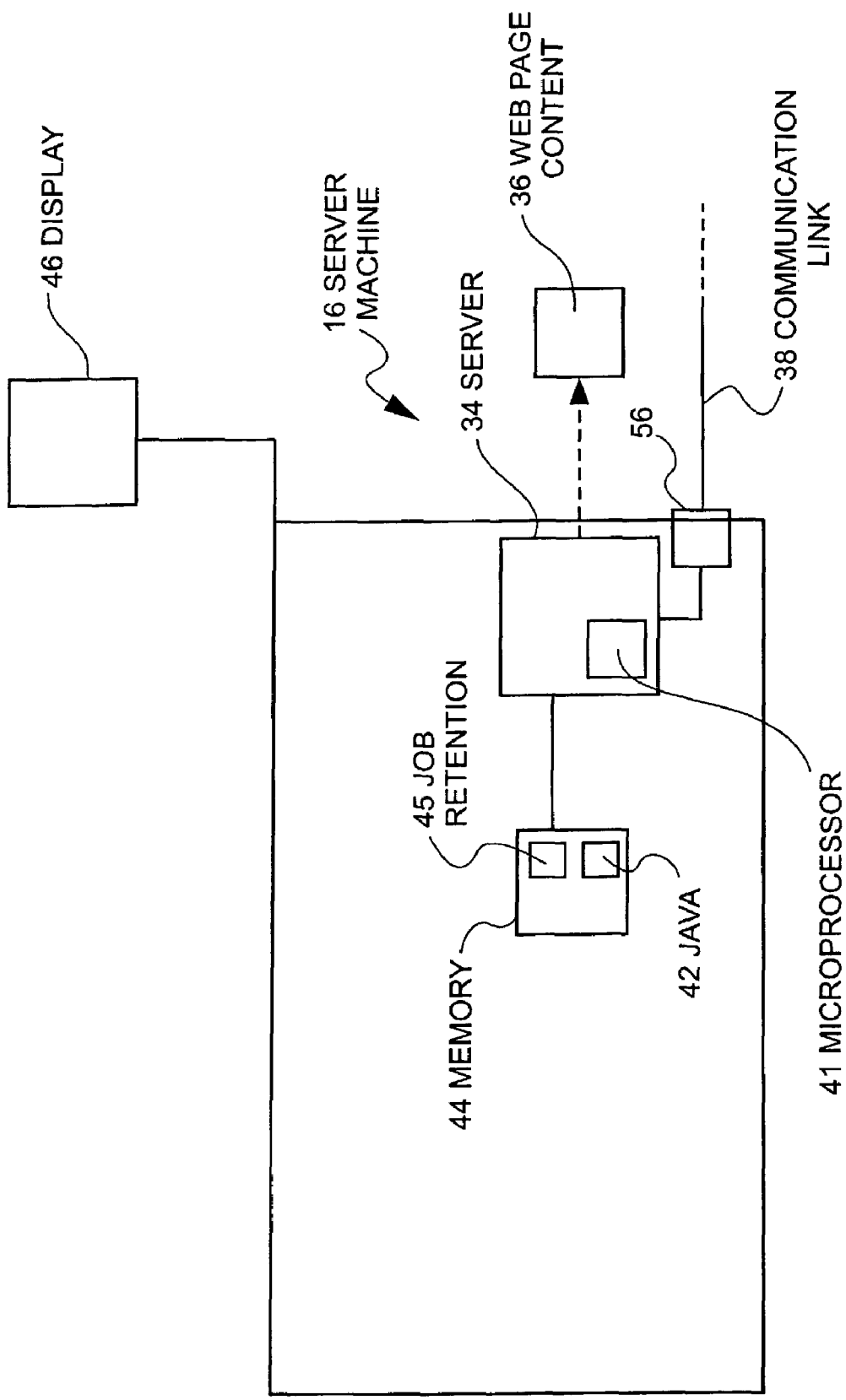
FIG. 3 is a schematic representation of a server machine depicted in FIGS. 1-2 incorporating teachings of the present invention.

Referring to drawing FIG. 3, one embodiment of a second server machine 16 for carrying out the methods of the present invention is shown. Second server machine 16 is configured with both an embedded web interfacing system (e.g., a server 34) for enabling access and interaction with other devices linked to local and external communication networks, including the World Wide web, a LAN, a WAN, an intranet, the computer network of an on-line service, etc., and printer-specific hardware and software. The printer-specific hardware and software of second server machine 16 may be provided in any conventional printer configuration known in the art, including those associated with laser printers, impact printers, photographic printers, and inkjet printers. Second server machine 16 includes one or more local displays 46, which may comprise a conventional monitor, a monitor coupled with an integrated display, an integrated display (e.g., an LCD display), or other means for viewing print queues, print attributes, and associated data or processing information, including printer specific information. Second server machine 16 also includes a network interface (I/O) 56 for bi-directional data communication through one or more of the various networks (LAN, WAN, Internet, etc.) using communication paths or links known in the art, including wireless connections, ethernet, bus line, Fibre Channel, ATM, standard serial connections, and the like.

Second server 34 provides one or more web server functions to requesting users linked by way of one or more of the various networks (LAN, WAN, Internet, etc.). The second server machine 16 of the present invention may thus be the same as or conceptually similar to the printer apparatus configured with an embedded web server described in U.S. Pat. No. 5,956,487 to Venkatraman et al., assigned the assignee of the present invention, the disclosure of which is incorporated by reference herein in its entirety.

Still referring to drawing FIG. 3, the embedded second server 34 of the present invention includes a microprocessor 41 responsible for controlling all aspects of second server 34. Thus, microprocessor 41 is configured to process communication protocols and executable programs associated with second server 34 which are stored in ROM (not shown) and/or hard disk memory 44. In an embodiment, second server 34 uses microprocessor 41 and the ROM-stored protocols to exchange data with other devices/users on one or more of the networks via HTTP and Simple Mail Transfer Protocol (SMTP), although other protocols such as File Transfer Protocol (FTP), Simple Network Management Protocol (SNMP), and Gopher document protocol may also be supported. Second server 34 is further configured to send and receive HTML-formatted files.

Microprocessor 41 is configured to perform some or all of the printer specific functions of second server machine 16, including control of printer specific hardware and software. Microprocessor 41 is provided with memory 44 in the form of RAM, and/or ROM, and/or hard disk memory. As used herein, memory 44 designated for temporarily or permanently storing one or more print jobs or other data storage device in second server machine 16 is referred to as job retention 45. In one embodiment, a percentage of memory 44 in second server machine 16 may be dedicated to second server 34. Alternatively, second server 34 may share the available memory 44 in second server machine 16 with job retention 45. Typically, second server machine 16 will be equipped with a minimum of 64 megabytes of RAM, although less RAM may be used in certain configurations.

Second server machine 16 may contain executable software programs stored in memory 44 related to the operation of second server 34. Memory 44 may also contain printer specific software programs relating to the operation of printer specific hardware. Alternatively, a separate hard disk (not shown) may optionally be provided with the requisite software programs for printing.

Using microprocessor 41, associated software, and internal circuitry of second server machine 16, second server 34 supports one or more control operations that relate to the function of second server machine 16. Second server 34 is configured to support the complete set of printing operations of second server machine 16, including access, control, and operation of printing target image 28.

In accordance with the present invention, memory 44 may contain at least one directory 42, which stores at least one interactive application configured for accessing and managing print jobs stored in job retention 45 of second server machine 16. The at least one interactive application may also, or alternatively, be stored in a directory associated with separate memory dedicated to second server 34.

In addition to being linked to a LAN or WAN, second server machine 16 may be linked directly to the Internet via network interface 56 and communication link 38 attached thereto. Embedded second server 34 within second server machine 16 is provided with at least one URL, by which it is identified over a network, and which can be accessed via HTTP, for example, from a remotely located workstation over a LAN, WAN, or the Internet. Additional URLs may be provided for components of second server machine 16 that have differing functions. At least one interactive application may be stored in memory 44 of second server machine 16. The at least one interactive application includes graphical user interface control panel options, menus, and/or links for accessing and managing print jobs found in second server machine 16.

In one embodiment of the interactive application, browser 18 downloads and displays the requested second web content 36 and requests the source file of the at least one interactive application from the second server 34 via communication link 38. Second server 34 processes the request, retrieves the at least one interactive application from memory 44, and transmits the at least one interactive application to browser 18, where it is downloaded and then executed by a platform residing on the client machine 12, or embedded within the browser 18.

Java is the name of one very well-known and popular object-oriented computer programming language that is used to develop software applications. Java's popularity stems in part from its relative simplicity and the fact that Java is written in a manner that allows different computers (i.e., platforms) to execute the same Java code. In other words, Java is platform-independent. This feature has caused the use of Java to greatly increase with the growing popularity of the Internet, which allows many different types of computer platforms to communicate with each other. Small Java programs, called "applets" are written to accomplish specific tasks. For example, the interactive application may be downloaded to the client machine 12 in Java computer programming language. At a minimum, the Java Virtual Machine platform comprises at least a Java-enabled browser, and a Java interpreter to run Java programs. A Java Virtual Machine platform may reside on the MFP 50 or the client machine 12, or both. Generally, a Java Virtual Machine platform may be found on a computing device configured with a browser of any sort. Upon closing a session with the at least one interactive Java application, the downloaded Java application is usually configured to be automatically removed from the executing device in order to free up resources for other applications.

Thus, from the foregoing, it can be seen that the second web content 36 enables a device to display a print dialog box 200 that includes selectable options 204. The print dialog box 200 may be formulated via a Java applet or other application that is downloaded by or resides within a browser or extension, such as browser 18 and extension 24. The selectable options 204 are based upon the capabilities of the second server machine 16. In addition, the second web content 36 may cause the executing device to display a post-process image 202 using the target image 28. The post-process image 202 is again based upon the capabilities of the second server machine 16. Further, the second web content 36 displays the status information as the print job is processed.

Although second server machine 16 has been depicted in a printing embodiment, other embodiments are contemplated. For instance, second server machine 16 may be primarily for display, where a web server is embedded into a television, videoconference equipment, slide projector, computer monitor, or other device capable of graphically displaying the image. Further, second server machine 16 may possibly serve a primarily audio function, where the image is interpreted and then transformed into sound representations. Text may be "read" by the second server machine 16. Musical representations may be interpreted and then "played" by the second server machine 16. Alternatively, second server machine 16 may generate a holographic representation of the image data. Any combination of second server machine 16 functions described above may be employed in any fashion to create the desired output.

Figure 2:
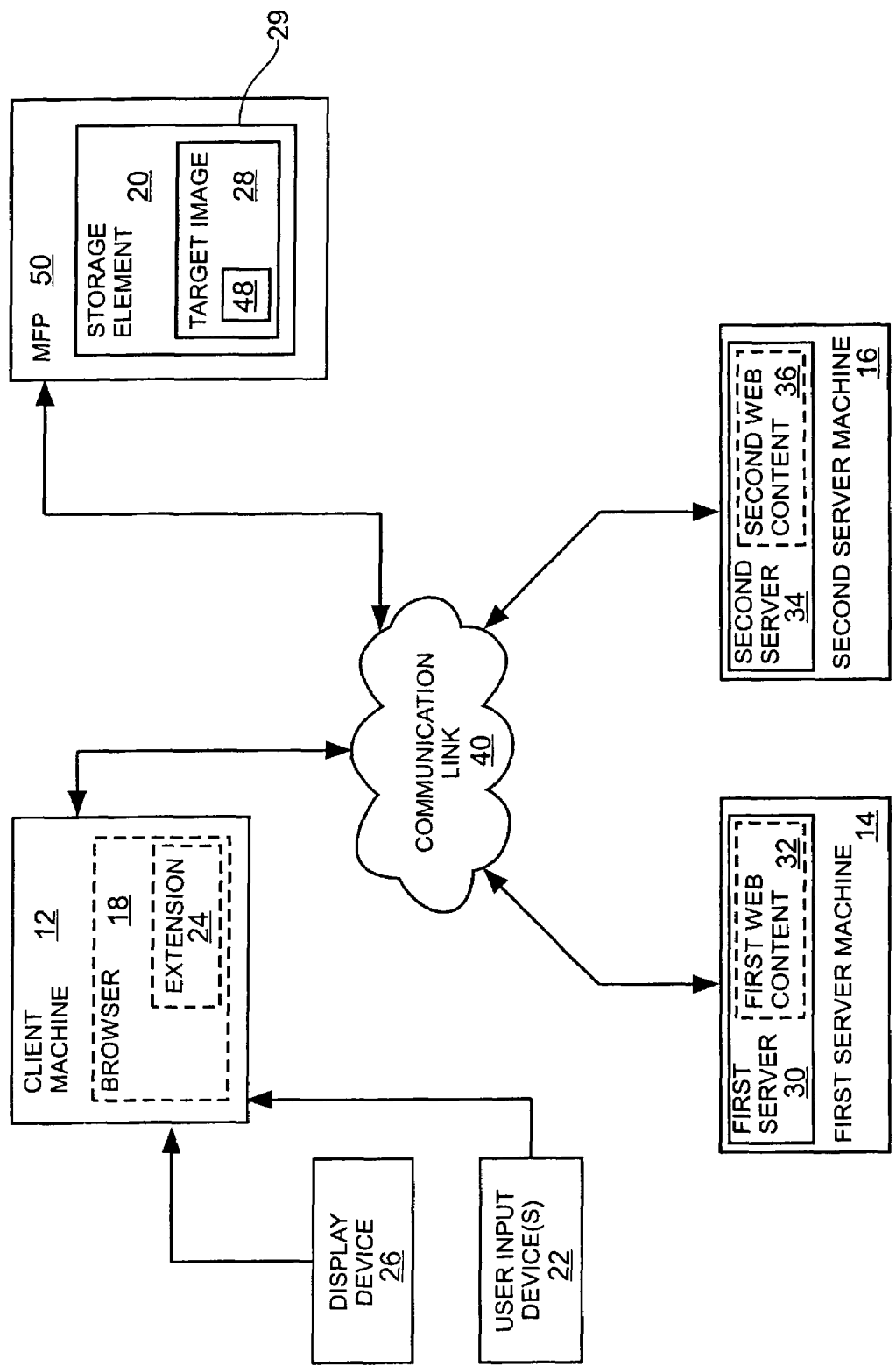
FIG. 2 is a schematic representation of a second embodiment incorporating teachings of the present invention wherein the MFP is configured with a storage element.

In a second embodiment, shown in drawing FIG. 2, the MFP 50 is configured to store target image 28. In this embodiment, a user provides input in order to define design data 48 that describes the user-defined image. A user may define data via either MFP 50 or client machine 12, as described hereinabove. Importantly, at least a portion of the image data is derived by way of MFP 50. Next, the user selects to store the design data 48 and image data as a target image 28. This option may be provided to the user via a user interface displayed by way of the MFP 50 or client machine 12. In response to this user input, the MFP 50 or client machine 12 identifies and stores the design data 48 (user defined) and image data as the target image 28 in storage element 20.

Consequently, when client machine 12 subsequently receives generic access instructions, client machine 12 will respond to those instructions by accessing target image 28. Thus, the target image 28 is the target data associated with a user of MFP 50. Notably, a user may use any device configured with an appropriate browser and extension to configure, store, and retrieve a target image. In addition, since the image is associated with the user, generic access instructions would access a different target image 28 if a different user utilized an identical or same device. User login card key or any other software or hardware means may be used to associate the target image 28 with the user.

In addition, the target image 28 may be stored in a file format that is system independent, as discussed earlier, such as PDF format. Next, the user provides the client machine 12 with input causing the browser to transmit an appropriate request to the first server machine 14 for a first web content 32. As noted and shown in FIG. 1, client machine 12 configured with browser 18 may be used.

Upon receiving the first web content 32, the browser 18 begins executing the access instructions included in the first web content 32. The first web content 32 includes a set of commands also including one or more generic access instructions and additional commands for causing the display device 26 to display the image represented by the design data 48 and image data. The execution of the generic access instructions results in appropriate generic access requests being generated that cause the target image 28 to be retrieved from storage element 20 of the MFP 50.

The client machine 12 responds to the generic access instructions to retrieve the target image 28 by way of extension 24. The extension 24 is configured to respond to the execution of generic access instructions by generating corresponding commands that cause the target image 28 associated with the user of client machine 12 to be accessed. Specifically, the extension 24, implemented via API or other means, generates a set of commands to retrieve the target image 28 in response to the generic access instructions. After the target image 28 is retrieved, the content transmitted to the browser 18 causes the display device 26 to display the user-defined image.

In order to print the target image 28 from the client machine 12, the user causes the browser 18 to transmit an appropriate request to the second server 34 for the second web content 36. The second server 34 responds by transmitting the second web content 36 to the browser 18. The second web content 36 includes generic access instructions for effecting the retrieval of target image 28, if necessary.

In addition, the second web content 36 includes instructions to make use of the retrieved image to display a print dialog box 200 that may include a post-process image 202 of the target image 28. The display of the print dialog box 200, shown in FIG. 10, is via the second web content 36 as opposed to the local operating system or the browser 18. The print dialog box 200 configuration depends on the printing capability of the second server machine 16 as well as the capability of the device executing the browser. Therefore, the print dialog box 200 displays selectable options 204 that may be based upon the capabilities and characteristics of the second server machine 16. The status of selectable options 204 may be graphically represented within the post-process image 202 to depict the selected options. For instance, if a user selects that the print job should be printed in duplex mode from selectable options 204, a graphical depiction of a folded corner 218 with printing on the second side of the page may appear in the lower right-hand corner of the post-process image 202 of the target image 28. Likewise, a graphical depiction of duplex selection 208, such as a marked box, may further evidence the print configuration selected by the user. If the client machine 12 is configured with a display device 26 that is limited, the print dialog box 200 may be tailored to the capability of the display device.

After the user configures and requests printing via print button 210 or other means provided by print dialog box 200, the second web content 36 causes the client machine 12 to generate a print job. The print job describes the target image 28 and includes the appropriate commands to cause the second server machine 16 to print the target image 28. The second web content 36 further causes the client machine 12 to transmit the print job to the second server machine 16.

Importantly, the second web content 36 is further configured to transmit appropriate requests to the second server machine 16 in order to determine the print job status. Requests and responses are transmitted on a periodic basis to effectively update the print job status. When a response is received indicating the print job status has changed, the second web content 36 causes the client machine 12 to display this information. One embodiment of a second server machine 16 for carrying out the printing methods of the present invention is shown in drawing FIG. 3, as previously discussed.

The second web content 36 also enables a client machine 12 to display a print dialog box 200 that includes selectable options 204. The print dialog box 200 may be invoked via a Java applet or other application that is downloaded or resides within the extension 24. The selectable options 204 are based upon the capabilities of the second server machine 16. In addition, the second web content 36 may cause the client machine 12 to display a post-process image 202 from the target image 28. The post-process image 202 is again based upon the capabilities of the second server machine 16. Further, second web content 36 displays updating status information as the output is processed.

Figure 4A:
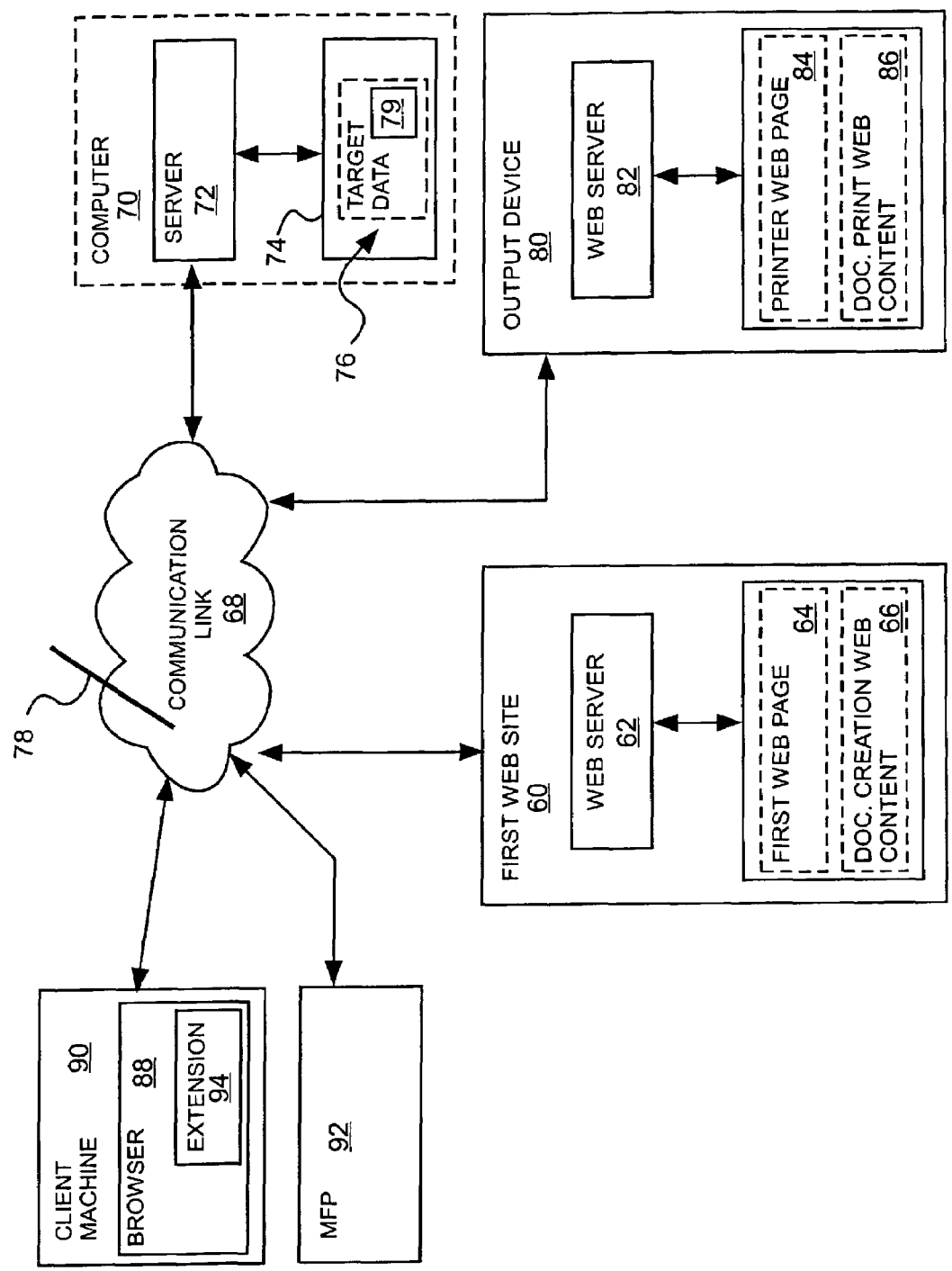
FIG. 4A is a schematic representation of a third embodiment incorporating teachings of the present invention.

A third embodiment, as shown in drawing FIG. 4A, comprises a client machine 90 and MFP 92 in a distributed environment. Client machine 90 executes browser 88 upon request from a user of the client machine 90. Browser 88 sends communications through communication link 68 to communicate with other devices. Firewall 78 may be utilized, depending on communication configuration, and includes a conventional proxy server that allows client machine 90 to communicate with other devices. Firewall 78 may also filter out unwanted communication packets. MFP 92 also sends communications through communication link 68 to communicate with other devices. Firewall 78 may also be utilized.

Figure 9:
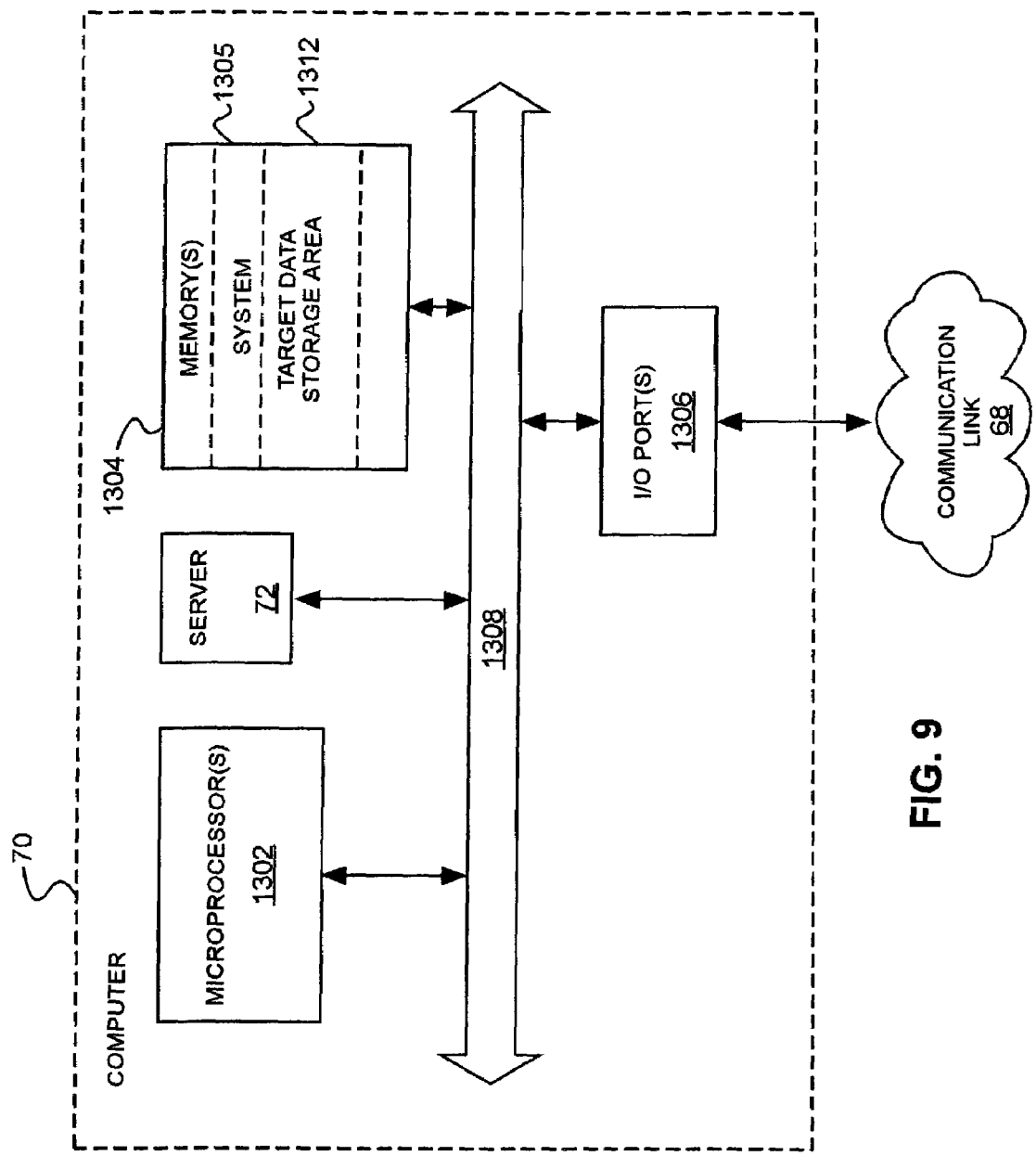
FIG. 9 is a representation of computer shown in FIGS. 4A-4B.

Computer 70, depicted in drawing FIG. 9, includes a microprocessor 1302, memory 1304, a local interface(s) 1308, and I/O port(s) 1306. Memory 1304 is further comprised of system memory 1305 and target data storage area 1312. Target data storage area 1312 may store individual target data 76, composed of design data 79 and image data. Local interface(s) 1308 facilitate communication between the internal circuitry and devices of computer 70 as well as communication link 68 via the I/O port(s) 1306.

Figure 6:
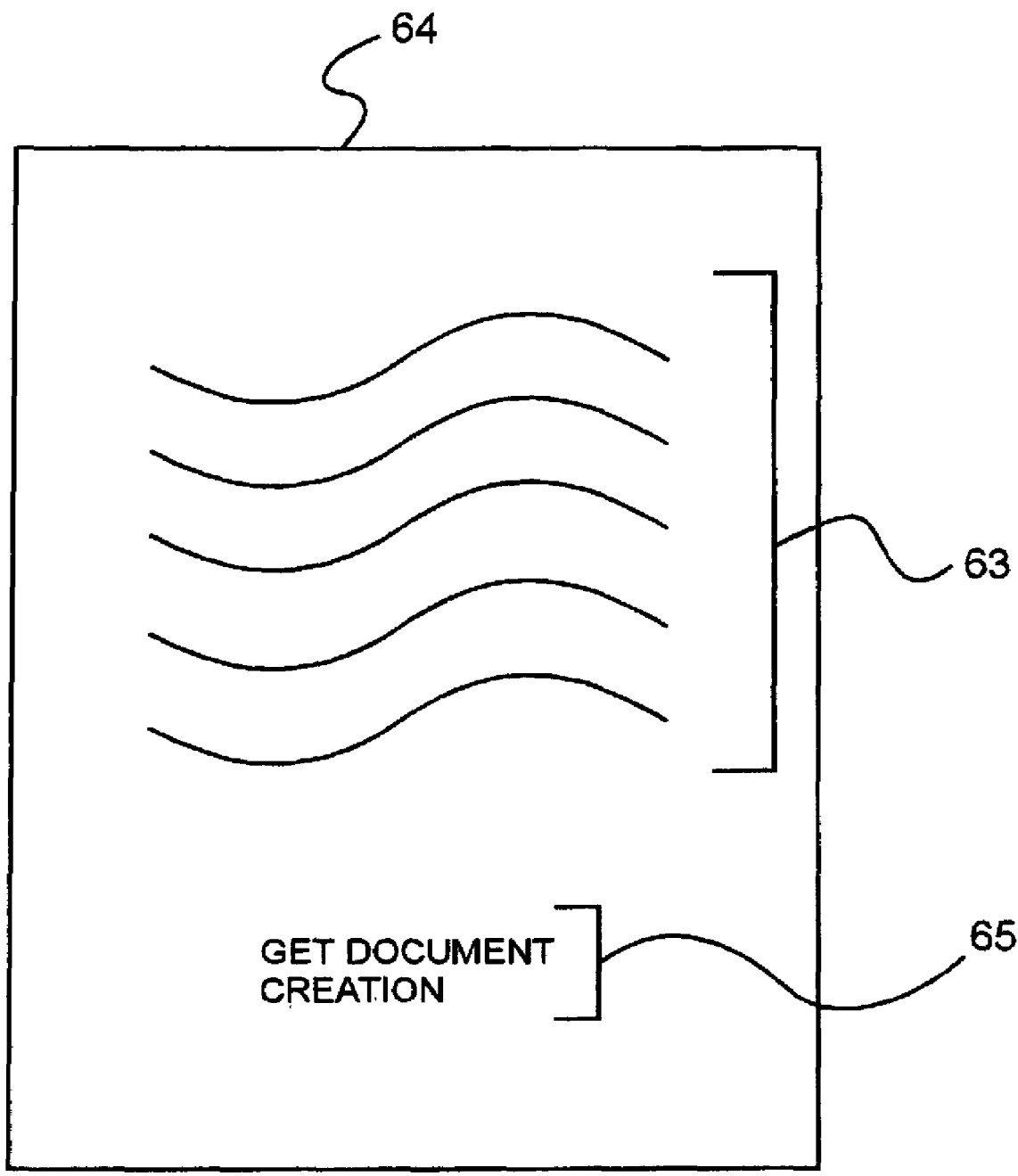
FIG. 6 is a representation of first web page shown in FIGS. 4A-4B.

When using client machine 90, a user's request causes browser 88 to access a first web site 60, containing a web server 62, a first web page 64, and a document creation web content 66. First web page 64, as shown in drawing FIG. 6, contains a text portion 63 as well as a document creation hyperlink 65 to the document creation web content 66 shown in drawing FIG. 4A. Upon selection of the document creation hyperlink 65, the document creation web content 66 allows a user to configure an image. The image may be configured from devices and images available to the client machine 90. For instance, images contained by computer 70 as well as images available on the Internet may be available. The data describing the image may be formatted in a way that is device independent, such as PDF format, as described hereinbefore.

The document creation web content 66 also provides a means for a user to save image data as well as the design data 79 as target data 76, which is associated with the user. Upon user request to store target data 76, document creation web content 66 generates generic access instructions in order to cause the design data 79 generated by the user to define the image as well as the image data to be stored as target data 76. Target data 76 is associated with the user. Association may be accomplished by user login information, or other identification means.

Association of target data 76 occurs upon storage, and a user may store multiple sets of target data. Any set of previously stored target data 76 that is associated with the user requesting retrieval may be accessible. Furthermore, the user may specify default target data 76. Default images may be automatically retrieved upon generic access instruction generation via web content. Alternatively, a menu or other selection means may be employed to specify desired target data 76.

MFP 92 is configured with the capability to cause the storage of at least a portion of the image data experienced by the MFP 92. Therefore, target data may be acquired by processing a document on the MFP 92. Any other functions of the MFP 92 capable of generating image data may be used. Furthermore, document creation web content 66 may be tailored to the device accessing the content. For instance, the document creation web content 66 may be configured to respond to the device accessing it by providing differing options or functionality.

Importantly, if firewall 78 is employed for communication between extension 94 and computer 70, a suitable firewall friendly protocol, such as HTTP, is used to transfer target data 76 to server 72 of computer 70 and to storage area 74. Thus, printing may be accomplished by HTTP.

Extension 94 responds to the generic access instructions generated by the document creation web content 66 and causes the target data 76 to be stored in the storage area 74 of a computer 70. Again, at least a portion of target data 76 may be stored by way of MFP 92. Extension 94 communicates the target data 76 over communication link 68 to computer 70. Alternatively, communications may be accomplished via both communication link 68 and firewall 78 to transfer target data 76 to server 72 of computer 70. Importantly, if firewall 78 is employed for communication between extension 94 and computer 70, a suitable firewall friendly protocol, such as HTTP, is used to transfer target data 76 to server 72 of computer 70 and to storage area 74. Thus, printing may be accomplished by HTTP across the Internet. It is important to note that, in other embodiments of the invention, other communication protocols (either now existing or yet to be developed) may be used.

Depending on the communication configuration of first web site 60, computer 70, and output device 80, communications may be realized via communication link 68 and possibly firewall 78, if needed. Communications may be accomplished via conventional means, such as I/O ports, network interface cards, or other communication devices. Further, communication link 68 may comprise routers, repeaters, hubs, or other communication means known in the art.

Document creation as depicted and described hereinabove may be commercialized as a document creation service, available to users in communication with shown devices. Information and payment means may be included in first web page 64. The present invention contemplates that at least a portion of data processed in the distributed imaging system described is obtained from an MFP.

Figure 5:
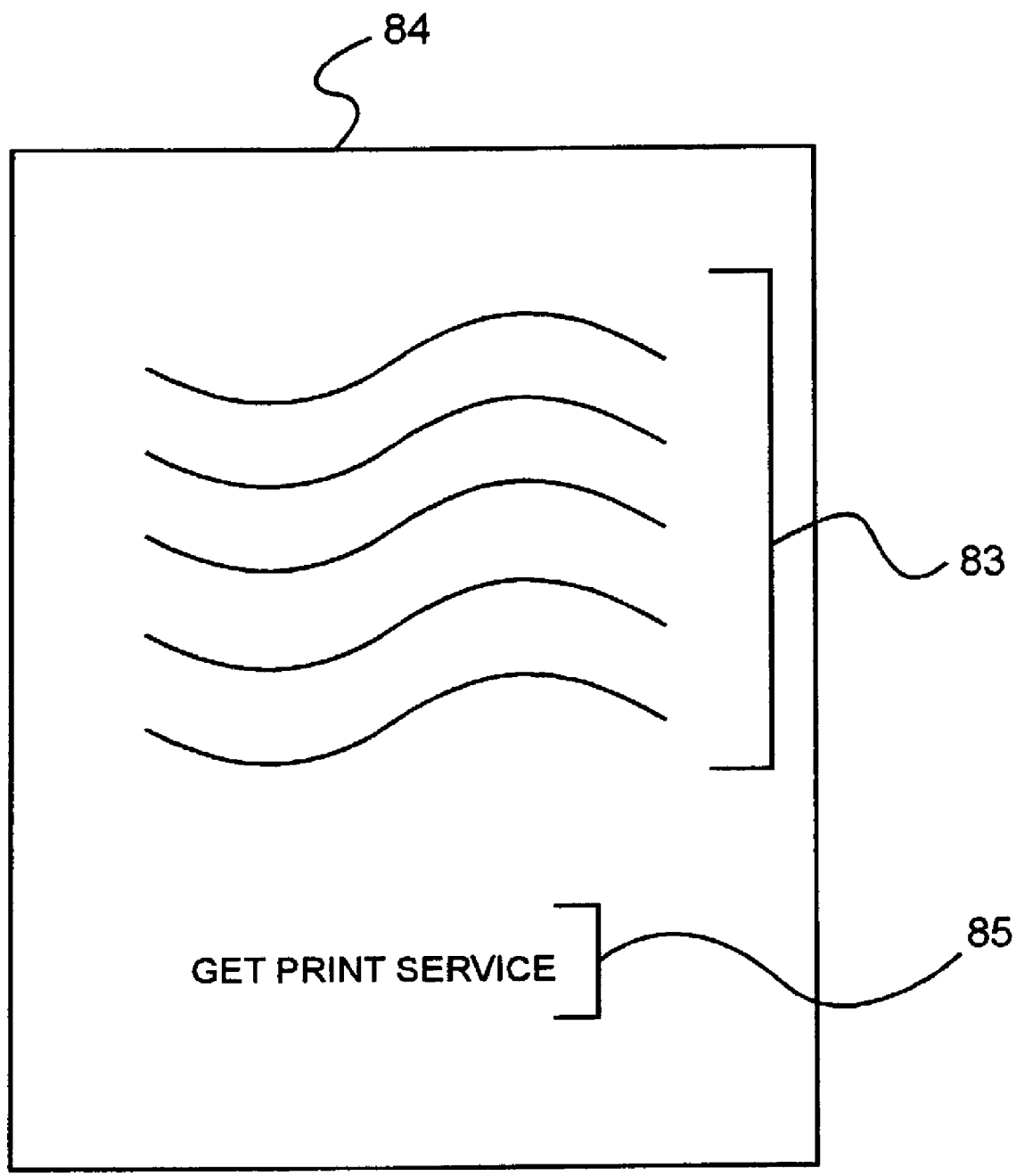
FIG. 5 is a representation of printer web page shown in FIGS. 4A-4B.

Subsequent to document creation, a user may also print the target data 76. A user of client machine 90 executes browser 88 and inputs the URL of the printer web page 84, thus requesting printer web page 84. Web server 82 of the output device 80 responds to the request by transmitting the printer web page 84 to the browser 88, which displays printer web page 84 on the client machine 90. The printer web page 84 includes a text portion 83 as well as a get document print service hyperlink 85, as shown in drawing FIG. 5. Upon the user selecting the get document print service hyperlink 85, the document print web content 86 is requested by the browser 88 and transmitted by web server 82. Document print web content 86 contains generic access instructions that cause extension 94 to generate generic access requests in order to retrieve target data 76. Generic access requests for retrieval may contain a file format for the retrieved data. Importantly, the desired file format may be different from the originally stored file format of target data 76. Thus, the retrieval generic access requests communicate the desired file format to server 72 and server 72 provides the target data 76 to extension 94 in the desired format. Accordingly, generic access requests including file format specifications may be tailored depending on the capability of the client machine 90 and output device 80, as well as the capability of the communication link 68.

Figure 4B:
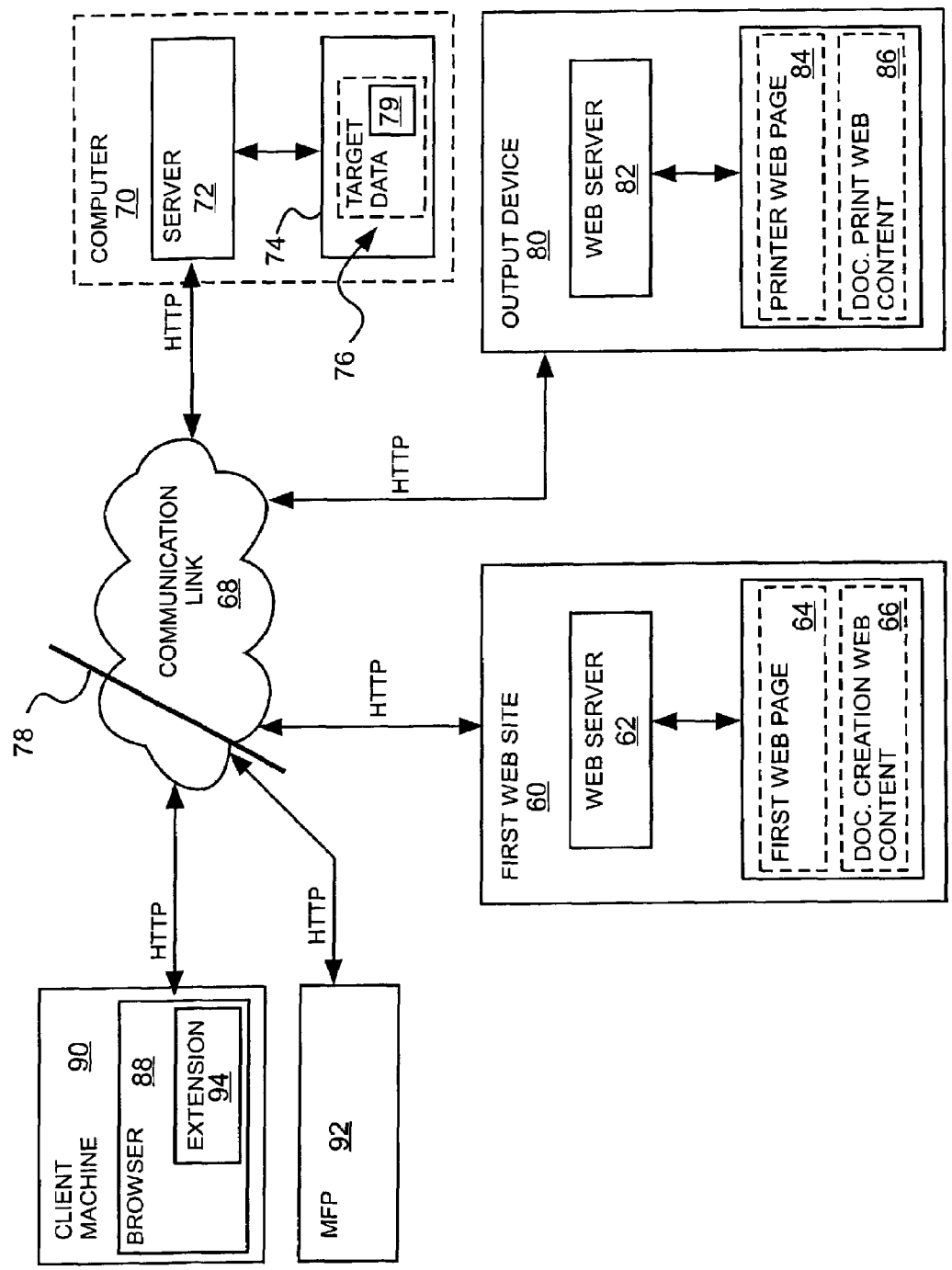
FIG. 4B is a schematic representation of a fourth embodiment incorporating teachings of the present invention.
Figure 4C:
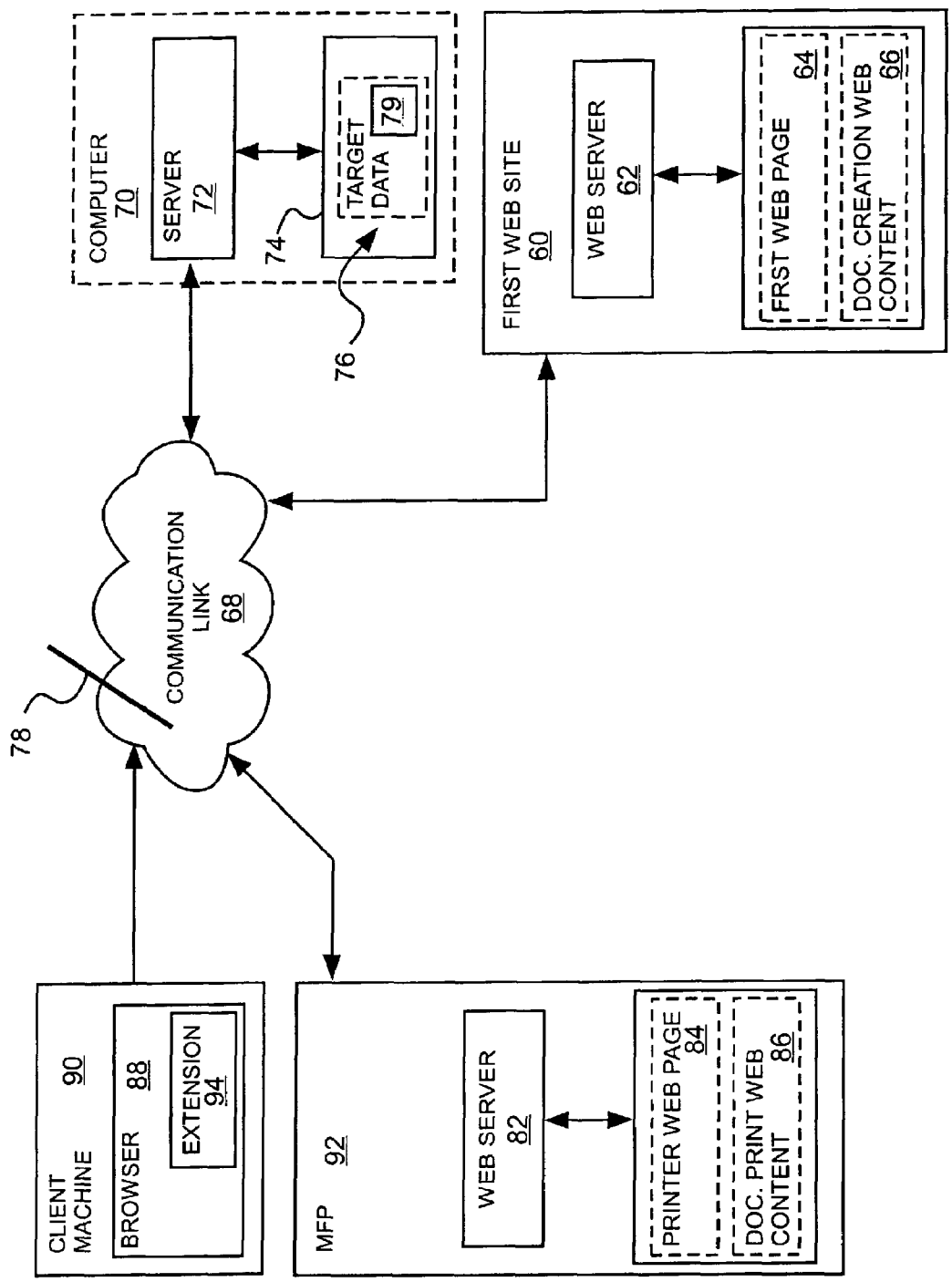
FIG. 4C is a schematic representation of an alternate embodiment of the present invention.

Turning briefly to FIG. 4C, an MFP 92 is configured with a web server 82, printer web page 84, and document print web content 86. As such, MFP 92 may be used to print the target data 76. MFP 92 may be used as described above in lieu of output device 80, as described herein below, when configuring a print job by way of a client device. Otherwise, the MFP 92 of FIG. 4C may be used to acquire and print images. By way of document print web content 86, the image may be printed using the hardware and software of the MFP 92.

Turning back to FIG. 4A, a document print service, as depicted and described hereinabove by selecting the get document print service hyperlink 85, may be commercialized as a printing service, available to accessible users. Information and payment means may be included in printer web page 84.

Further, the browser 88 and/or extension 94 may be tailored depending on the capability of the client machine 90 and output device 80, as well as the capability of the communication link 68 to the client machine 90. Additionally, a browser 88 may be enabled with adaptable extensions or extension functionality that corresponds to the characteristics of the client machine 90, communication capability, output device 80, or user preference. For instance, image quality may be altered to correspond with communication capabilities of the client machine 90. Alternatively, target data 76 may be converted or otherwise altered to improve an aspect of printing to output device 80.

Figure 8:
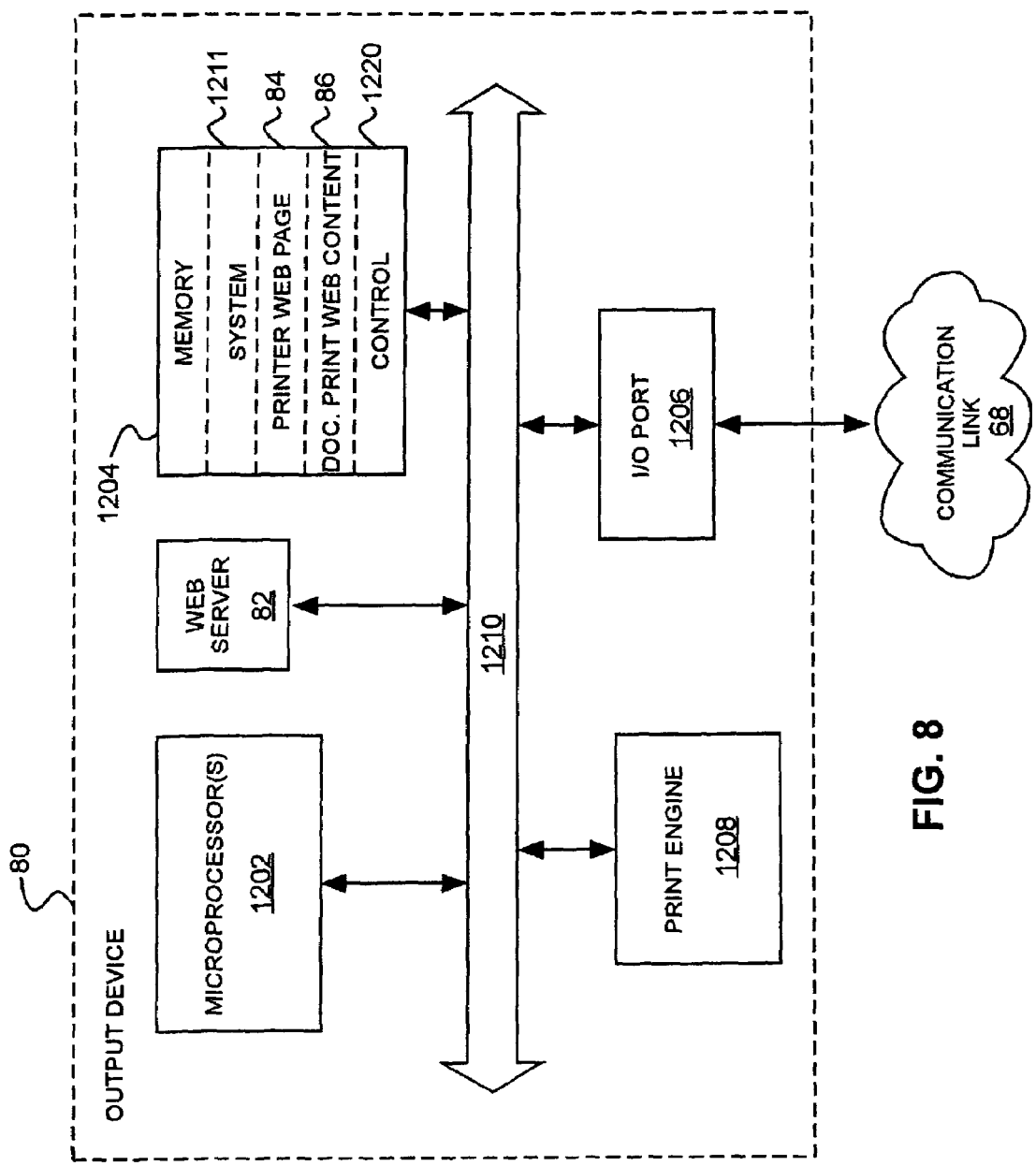
FIG. 8 is a representation of output device shown in FIGS. 4A-4B.

Referring to drawing FIG. 8, output device 80 is configured with an embedded web server 82 for enabling access and interaction with other devices linked to local and external communication networks, including the World Wide web, a LAN, a WAN, an intranet, the computer network of an on-line service, etc., and the print engine 1208. Output device 80 is also configured with a microprocessor 1202 which executes the instructions of web server 82, including processing communication protocols and executable programs associated with web server 82 which are stored in ROM (not shown) and/or memory 1204. Memory 1204 may comprise system memory 1211, printer web page 84, document print web content 86, and printer control program 1220.

The print engine 1208 of output device 80 may be provided in any conventional configuration known in the art, including those associated with laser printers, impact printers, photographic printers, and inkjet printers. Also, as mentioned earlier, MFP 92 output hardware and software may be used in lieu of print engine 1208 if configured accordingly.

In an embodiment, web server 82 uses microprocessor 1202 and the ROM-stored protocols to exchange data with other devices/users on one or more of the networks via HTTP and SMTP, although other protocols such as FTP, SNMP, and Gopher document protocol may also be supported. Web server 82 is further configured to send and receive HTML-formatted files.

Microprocessor 1202 is configured to perform some or all of the printer specific functions of output device 80, including control of printer specific hardware and software as well as print engine 1208. Microprocessor 1202 is provided with memory 1204 in the form of RAM, and/or ROM, and/or hard disk memory. As used herein, the portion of memory 1204 designated for temporarily or permanently storing one or more print jobs or other data storage device in output device 80 is referred to as job retention 1245 (not shown). In one embodiment, a percentage of memory 1204 in output device 80 may be dedicated to web server 82.

Output device 80 may also contain executable software programs stored on memory 1204 related to the operation of web server 82. Memory 1204 may also contain printer specific software programs relating to the operation of print engine and/or printer specific hardware. Alternatively, a separate memory capability (not shown) may optionally be provided with the requisite software programs for printing.

Using microprocessor 1202, printer control software 1220, and internal circuitry of output device 80, web server 82 supports one or more control operations that relate to the function of output device 80. Web server 82 is configured to support the complete set of printing operations of output device 80, including access, control, and operation of printing in conjunction with printer control software 1220.

In accordance with the present invention, memory 1204 may contain at least one directory which stores at least one interactive application configured for accessing and managing print jobs stored in job retention 1245 (not shown) of output device 80. The at least one interactive application may be stored in memory 1204.

In addition to being linked to a LAN or WAN, output device 80 may be linked directly to the Internet via I/O port(s) 1206 and communication link 68 attached thereto. Local interface(s) 1210 facilitate communication between the internal circuitry and devices of output device 80 as well as communication link 68 via I/O port 1206. Embedded web server 82 within output device 80 is provided with at least one URL, by which it is identified over a network, and which can be accessed via HTTP, for example, from a remotely located workstation over a LAN, WAN, or the Internet. Additional URLs may be provided for components of output device 80 that have differing functions, as depicted by printer web page 84 and document print web content 86.

The output device 80 comprises a web server 82 providing one or more web server functions to requesting users linked by way of one or more of the various networks (LAN, WAN, Internet, etc.). The output device 80 of the present invention may thus be the same as or conceptually similar to the printer apparatus configured with an embedded web server described in U.S. Pat. No. 5,956,487 to Venkatraman et al., assigned to the assignee of the present invention.

Upon retrieval of target data 76, document print web content 86 includes instructions to make use of the retrieved image to display a print dialog box 200, shown in FIG. 10, that includes a post-process image 202 (i.e., a print preview image) of the target data 76. It is emphasized that the display of the print dialog box 200 is by operation of the document print web content 86. Furthermore, the print dialog box 200 displays selectable options 204 that are based upon the capabilities of the output device 80. The selectable options 204 that are selected may be graphically represented within the print dialog box 200 and/or the post-process image 202. For instance, if a user selects that the print job should be stapled a graphical depiction of a staple 216 may appear in the upper left-hand corner of the post-process image 202 of the target data 76. In addition, a graphical depiction of staple selection 206 may appear in the print dialog box 200.

After the user configures and requests printing by selecting print button 210 or other means provided by print dialog box 200, the document print web content 86 causes the client machine 90 to generate a print job. The print job describes the target data 76 and includes the appropriate commands to cause the output device 80 to print the target data 76. The document print web content 86 further causes the client machine 90 to transmit the print job to the output device 80 to be printed. Importantly, the document print web content 86 downloaded in browser 88 is further configured to transmit appropriate requests to output device 80 in order to determine the print job status. Requests and responses are transmitted on a periodic basis to effectively update the print job status. When a response is received indicating the print job status has changed, the document print web content 86 causes the client machine 12 to display this information.

Although browser 88/extension 94 have been described as processing one set of target data 76 to one output device at a time, multiple print jobs and output devices may be employed. The present invention contemplates that printer web page 84 may be configured to accept and manage multiple target data set requests to multiple output devices. For instance, printer web page 84 may be configured to accept at least one URL address of another desired output device. The user enters the desired output device(s) and selects the get document print service hyperlink 85, and the document print web content 86 is configured to respond to the user request. In one embodiment, the document print web content 86 is able to interrogate the available output devices and graphically represent each output device's selectable options as well as update each print job as it is processed by each output device. Alternatively, multiple browser applications could be executed in separate windows and managed separately by the user as described in the present invention.

In addition, if multiple target data sets are available to a user, menus may be provided to the user as part of the document print web content 86 along with corresponding output device URLs. Therefore, the user could select a target data set from any available target data sets and prescribe a destination URL (and thereby an output device) for that target data set. Thus, the present invention contemplates multiple target data set output. Further, the present invention contemplates multiple output device selection. Even further, the present invention contemplates multiple target data sets in combination with multiple output device selection.

Also, the output device 80 may further distribute the print job. For example, if a user requests twenty copies of a certain target data 76 to be printed, the output device may distribute the print job to multiple output devices to accomplish printing. Five of the original twenty copies of the desired target data 76 may be sent to four appropriate output devices for printing. Thus, a distributed printing environment utilizes output capability in a more efficient manner than typical serial printing in a networked printing environment.

In FIG. 4B, the distributed imaging environment and devices are similar to the embodiment depicted in FIG. 4A. However, as shown in drawing FIG. 4B, the firewall 78 separates the devices shown. Therefore, all communications between the devices may conform to appropriate firewall friendly protocol(s). HTTP is an Internet protocol and is depicted in drawing FIG. 4B for effectuation of communications between the devices. Importantly, printing may be effectuated across a firewall 78 via HTTP. As noted earlier, other communication protocols (either now existing or yet to be developed) may be used, for example HTTPS.

Importantly, the MFP is configured to cause the storage of at least a portion of data for access via at least one generic access instruction.

As noted hereinabove, FIG. 4C depicts an embodiment where MFP 92 is configured with web server 82 as well as printer web page 84 and document print web content. Essentially, functions are accomplished in the same general manner as in the embodiment shown in FIG. 4B, except for the incorporation of the abovementioned elements into the MFP 92. Advantageously, MFP 92 may be used to output the target data 76, thus reducing the number of devices shown in FIG. 4B. Other combinations, additions, and deletions are possible and may be advantageous, depending on the specific use characteristics and configuration of the devices.

Although the foregoing description contains many specifics, these should not be construed as limiting the scope of the present invention, but merely as providing illustrations of some possible embodiments. Similarly, other embodiments of the invention may be devised which do not depart from the spirit or scope of the present invention. Features from different embodiments may be employed in combination. The scope of the invention is, therefore, indicated and limited only by the appended claims and their legal equivalents, rather than by the foregoing description. All additions, deletions, and modifications to the invention, as disclosed herein, which fall within the meaning and scope of the claims are to be embraced thereby.

What is claimed is:

1. A system for utilizing imaging data, comprising:
   a multifunction printing device for processing a hard copy and creating image data for a target image from said hard copy;
   a user profile accessible to said multifunction printing device;
   a personal imaging repository associated with said user profile for storing said image data;
   at least one generic access instruction associated with said multifunction printing device for automatically saving said image data to said personal imaging repository upon said processing said hard copy and creating said image data; and a client machine in communication with said multifunction printing device for inputting user defined design data for said target image and saving said design data to said personal imaging repository, said design data including information for formatting and printing of said target image, wherein said image data and said design data for said target image are subsequently retrieved from said personal imaging repository for generating a copy of said target image.

2. The system of claim 1, wherein said multifunction printing device includes functions selected from the group consisting of copying, scanning, printing, and faxing.

3. The system of claim 1, wherein said user profile comprises unique identification data associated with a user of said multifunction printing device.

4. The system of claim 1, wherein said personal imaging repository comprises a dedicated memory allocation on a storage device selected from the group consisting of a hard drive, a floppy drive, a memory, an optical drive, and a flash memory.

5. The system of claim 1, wherein said at least one generic access instruction associated with said multifunction printing device comprises a first instruction for utilizing said user profile to determine a path for saving said image data.

6. The system of claim 5, wherein said at least one generic access instruction associated with said multifunction printing device further comprises a second instruction for saving said image data to said pat determined by said first instruction.

7. The system of claim 1, wherein said at least one generic access instruction associated with said multifunction printing device resides on a server remote to said multifunction printing device and in communication with said multifunction printing device.

8. The system of claim 1, wherein said at least one generic access instruction is configured to save said image data in an independent image format.

9. The system of claim 1, further comprising a second generic access instruction associated with said multifunction printing device for retrieving data from said personal imaging repository associated with said user profile.

10. The system of claim 1, wherein said design data for said target image is stored separately from said image data for said target image.

11. A method of utilizing imaging data with a multifunction printing device, comprising:

processing a hard copy with said multifunction printing device and configuring image data obtained from said hard copy utilizing said multifunction printing device;

creating a target image from said image data;

defining design data for said target image, said design data defined by a user of said multifunction printing device and including information for formatting and printing of said target image;

automatically storing said image data and said design data for said target image to a storage location in accordance with a generic access instruction associated with said multifunction printing device, wherein said storage location comprises a personal imaging repository associated with a user profile of said user of said multifunction printing device; and subsequently retrieving said image data and said design data for said target image from said storage location and generating a copy of said target image from said image data and said design data.

12. The method of claim 11, wherein said processing a hard copy and configuring image data obtained from said hard copy comprises using a function of said multifunction printing device to create said image data.

13. The method of claim 12, wherein using said function of said multifunction printing device comprises using a function selected from the group consisting of copying, scanning, printing, and faxing.

14. The method of claim 11, wherein said processing a hard copy and configuring image data obtained from said hard copy comprises:

using said multifunction printing device to create a first set of imaging data from said hard copy;

retrieving a second set of imaging data from a secondary source; and combining said first set of imaging data and said second set of imaging data to create said target image.

15. The method of claim 14, wherein retrieving a second set of imaging data from a secondary source comprises retrieving said second set of imaging data from a secondary source selected from the group consisting of said personal imaging repository, the Internet, or a target image file stored remote to said multifunction printing device.

16. The method of claim 14, wherein retrieving a second set of imaging data from a secondary source comprises using said multifunction printing device to execute a second generic access instruction for retrieving said second set of imaging data.

17. The method of claim 11, wherein said creating a target image from said image data comprises creating said target image in an independent image format.

18. The meted of claim 11, wherein said storing said image data and said design data for said target image to a storage location comprises storing said image data and said design data for said target image to said storage location in an independent image format.

19. The method of claim 11, further comprising identifying said user of said multifunction printing device.

20. The method of claim 11, wherein said storing said image data and said design data for said target image to a storage location comprises storing said design data separately from said image data.

21. A method of creating an image from target image data using a multifunction printing device, comprising:

processing a hard copy with said multifunction printing device;

creating, using said multifunction printing device, a target image from said hard copy;

defining design data for said target image, said design data defined by a user of said multifunction printing device and including information for formatting and printing of said target image;

automatically saving said target image and said design data for said target image to a personal image repository associated with a user profile of said user of said multifunction printing device;

subsequently identifying said user of said multifunction printing device and executing a generic access instruction to retrieve said target image and said design data for said target image from said personal imaging repository associated with said user profile of said identified user; and using said multifunction printing device to create an image of said target image retrieved by said generic access instruction.

22. The method of claim 21, wherein said processing said hard copy includes at least one of scanning, copying, and faxing said hard copy with said multifunction printing device.

23. The method of claim 21, wherein said creating said target image from said hard copy includes creating image data for said target image.

24. The method of claim 23, wherein said automatically saving said target image includes saving said image data and said design data for said target image to said personal image repository.

* * * * *

UNITED STATES PATENT AND TRADEMARK OFFICE
CERTIFICATE OF CORRECTION

| | | |
|---|---|---|
| PATENT NO. | : 7,321,902 B2 | Page 1 of 1 |
| APPLICATION NO. | : 10/219101 | |
| DATED | : January 22, 2008 | |
| INVENTOR(S) | : Shell S. Simpson et al. | |

It is certified that error appears in the above-identified patent and that said Letters Patent is hereby corrected as shown below:

In column 7, line 32, delete "MPF" and insert -- MFP --, therefor.

In column 7, line 33, after "create," insert -- configure, --.

In column 9, line 62, after "assigned" insert -- to --.

In column 19, line 32, in Claim 6, delete "pat" and insert -- path --, therefor.

In column 20, line 34, in Claim 18, delete "meted" and insert -- method --, therefor.

Signed and Sealed this

Third Day of June, 2008

JON W. DUDAS
*Director of the United States Patent and Trademark Office*